(12) United States Patent
Rymarenko (10) Patent No.: US 10,863,047 B2
(45) Date of Patent: Dec. 8, 2020

(54) CONVERTING MEDIA USING MOBILE DEVICES

(71) Applicant: Christian Rymarenko, Munich (DE)

(72) Inventor: Christian Rymarenko, Munich (DE)

(*) Notice: Subject to any disclaimer, the term of this patent is extended or adjusted under 35 U.S.C. 154(b) by 0 days.

(21) Appl. No.: 16/496,859

(22) PCT Filed: Mar. 15, 2018

(86) PCT No.: PCT/EP2018/056548
§ 371 (c)(1),
(2) Date: Sep. 23, 2019

(87) PCT Pub. No.: WO2018/172184
PCT Pub. Date: Sep. 27, 2018

(65) Prior Publication Data
US 2020/0106908 A1    Apr. 2, 2020

(30) Foreign Application Priority Data

Mar. 23, 2017  (EP) ................................. 17162592

(51) Int. Cl.
*H04N 1/00*    (2006.01)
*G06T 7/593*   (2017.01)
(Continued)

(52) U.S. Cl.
CPC ......... *H04N 1/00827* (2013.01); *G06T 7/521* (2017.01); *G06T 7/593* (2017.01);
(Continued)

(58) Field of Classification Search
CPC .. H04N 13/239; H04N 13/246; H04N 13/271; H04N 13/243; H04N 13/254;
(Continued)

(56) References Cited

U.S. PATENT DOCUMENTS 9,858,876 B2 * 1/2018 Hao ..................... G09G 3/3677
9,899,030 B2   2/2018 Wang et al.
(Continued)

FOREIGN PATENT DOCUMENTS

EP          1 307 833 A2     5/2003

OTHER PUBLICATIONS

International Search Report for Application No. PCT/EP2018/056548, dated May 23, 2018.
(Continued)

*Primary Examiner* — Negussie Worku
(74) *Attorney, Agent, or Firm* — Seed Intellectual Property Law Group LLP (57) ABSTRACT

A method for converting media using mobile devices includes scanning, using a three-dimensional scanner of a mobile device, at least a part of a surface of a media carrier encoding a first media signal, thereby generating a depth image of the surface of the media carrier, and providing, by the mobile device, a second media signal corresponding at least partially to the first media signal encoded on the media carrier, wherein the second media signal is generated based on the depth image of the surface of the media carrier. Furthermore, a mobile device and a system for converting media are defined.

20 Claims, 3 Drawing Sheets

(51) Int. Cl.
  *H04N 1/32* (2006.01)
  *G06T 7/521* (2017.01)
  *H04B 1/20* (2006.01)

(52) U.S. Cl.
  CPC ......... *H04B 1/205* (2013.01); *H04N 1/32128* (2013.01); *G06T 2200/04* (2013.01); *H04N 2201/3264* (2013.01)

(58) Field of Classification Search
  CPC ... H04N 2013/0077; H04N 2013/0081; H04N 5/2252; H04N 5/33; H04N 9/07; H04N 13/257; H04N 13/275; H04N 13/296; G03B 17/55; G03B 17/563; G06T 17/20; G06T 15/50; G06T 17/00; G06T 19/00; H05K 7/20409; A61B 2034/2055; A61B 2034/2065; A61B 2090/3983; A61B 2090/3995; A61B 2505/05; A61B 34/20; A61B 34/30; A61B 5/0035; A61B 5/0059; A61B 5/0064; A61B 5/0077; A61B 5/055; A61B 5/064; A61B 5/4566; A61B 6/12; A61B 90/39; G05B 2219/49023; G06Q 30/0631; G06Q 30/0643
  USPC .......................................... 358/474, 471, 473
  See application file for complete search history.

(56) References Cited

U.S. PATENT DOCUMENTS

| | | | | |
|---|---|---|---|---|
| 9,948,920 | B2* | 4/2018 | Nash | G01B 11/25 |
| 9,978,147 | B2* | 5/2018 | Raniwala | H04N 13/246 |
| 10,132,616 | B2* | 11/2018 | Wang | G01B 11/22 |
| 10,210,618 | B1* | 2/2019 | Kuffner | G06T 7/11 |
| 10,257,495 | B1* | 4/2019 | Poder | G06F 21/36 |
| 10,282,914 | B1* | 5/2019 | Tran | G06T 17/00 |
| 10,375,323 | B2* | 8/2019 | Jones | H04N 5/23222 |
| 10,417,781 | B1* | 9/2019 | Konolige | G06T 7/60 |
| 10,460,515 | B2* | 10/2019 | Venshtain | H04N 7/157 |
| 2010/0060909 | A1* | 3/2010 | Conescu | G06F 3/1204 358/1.9 |
| 2012/0147152 | A1* | 6/2012 | Vogiatis | H04N 13/271 348/50 |
| 2014/0193047 | A1* | 7/2014 | Grosz | G06Q 30/0241 382/118 |
| 2016/0117544 | A1* | 4/2016 | Hoyos | H04N 5/23219 348/78 |
| 2016/0227196 | A1 | 8/2016 | Kang et al. | |
| 2017/0243352 | A1* | 8/2017 | Kutliroff | G06T 7/10 |
| 2018/0265396 | A1* | 9/2018 | Sun | C03B 37/02 |
| 2019/0057521 | A1* | 2/2019 | Teixeira | A61B 6/463 |
| 2019/0094981 | A1* | 3/2019 | Bradski | G02B 30/26 |
| 2019/0101377 | A1* | 4/2019 | White | G01B 11/14 |
| 2020/0005438 | A1* | 1/2020 | Morikawa | G06T 11/001 |
| 2020/0020173 | A1* | 1/2020 | Sharif | G06T 15/50 |

OTHER PUBLICATIONS

Fadeyev et al., "Reconstruction of Mechanically Recorded Sound by Image Processing", Journal of the Audio Engineering Society, Audio Engineering Society, New York, NY, US, vol. 51, No. 12, Dec. 1, 2003 (Dec. 1, 2003), pp. 1172-1185, XP001046098, ISSN: 1549-4950.

Fadeyev et al., "Reconstruction of Recorded Sound from an Edison Cylinder using Three-Dimensional Non-Contact Optical Surface Metrology", Aug. 8, 2004, retrieved from <https://www-cdf.lbl.gov/~av/cylinder-paper-PVF.pdf>, 38 pages.

\* cited by examiner

CONVERTING MEDIA USING MOBILE DEVICES

BACKGROUND

Technical Field

The present disclosure relates to a method for converting media using mobile devices, a mobile device, and a system that accommodates mobile devices configured to convert media. In particular, the present disclosure may relate to a method, a mobile device, and a system for generating a media signal based on a surface scan of a media carrier encoding the media signal.

Description of the Related Art

Media carriers, such as gramophone records, phonograph cylinders, compact discs, digital versatile discs, paintings or images, and the like, are broadly used to encode various forms of media, such as audio, video, images or interactive content. In order to store the media content on the media carrier, a corresponding media signal may be encoded on the media carrier, for example, by mechanically or optically changing a surface of the media carrier. To reproduce the encoded media signal, a player or reading device may read the media carrier in standardized form, detect the changes of the surface of the media carrier, and process the changes to generate the media signal. Typically, the entire media carrier has to be processed to extract the full media signal, which may correspond to a full length of the media signal. For example, in order to play a gramophone record, a record player continuously tracks grooves on the gramophone record and simultaneously reproduces the audio signal according to deviations of the grooves. This lengthy processing may be disadvantageous in cases where copies of the encoded media are to be stored for archiving and other purposes, such as for preserving the encoded media due to changes of encoding standards.

BRIEF SUMMARY

Therefore, an object of the present disclosure is to improve reproduction of media signals encoded on media carriers. The present disclosure is defined by a method for converting media using mobile devices, a mobile device, and a system embedding mobile devices for converting media.

According to a first aspect of the present disclosure, a method for converting media using mobile devices is described, wherein the method comprises scanning, using a three-dimensional scanner of a mobile device, at least a part of a surface of a media carrier encoding a first media signal, thereby generating a depth image of the surface of the media carrier, and providing by the mobile device, a second media signal corresponding at least partially to the first media signal encoded on the media carrier, wherein the second media signal is at least partially generated based on the depth image of the surface of the media carrier.

The method enables a conversion of the encoded (first) media signal into the second media signal based on a surface scan of the media carrier using the three-dimensional scanner of the mobile device. Accordingly, throughout this disclosure, a conversion of the first media signal into the second media signal can also be referred to as a reconstruction of the first media signal in the form of the second media signal, and vice versa. Therefore, the converted (second) media signal may also be referred to as the reconstructed (second) media signal, from or based on at least a part of the encoded (first) media signal.

The three-dimensional scanner captures changes of the surface of the media carrier in the depth image. Accordingly, the depth image may include depth information related to the surface of the media carrier and/or color information for individual elements of the depth image. For example, each picture element of the depth image may include at least one depth value, and preferably one or more color values, that may be used to reconstruct the surface of the media carrier. The reconstructed surface may be processed and analyzed to generate the second media signal corresponding to the encoded (first) media signal.

The method described herein enables a quick capture of the media carrier and an efficient generation of the encoded media signal without any lengthy and tedious reading, processing, or simultaneous reproduction of the encoded media signal on the media carrier.

The reconstructed (second) media signal may substantially correspond to at least a part of the first media signal. For example, the three-dimensional scanner may scan a part of the surface and the second media signal may correspond to the first media signal encoded on the scanned part. Even though the second media signal may differ from the first media signal due to processing parameters of the three-dimensional scan, the second media signal is to be understood as a reconstruction or conversion of those parts of the first media signal that are captured in the depth image.

The three-dimensional scanner may be a built-in scanner of the mobile device. As an alternative, the three-dimensional scanner may be connected to the mobile device. Current three-dimensional scanners are capable of capturing objects with a resolution in the range of micrometers or nanometers. Dedicated scanning devices may even achieve better resolutions. The resolution of the three-dimensional scanner may be adjusted to a resolution required for encoding the first media signal on the media carrier. Preferably, the mobile device has an integrated three-dimensional scanner that enables generation of depth images with a resolution in the range of nanometers. A mobile device with an integrated three-dimensional scanner may be readily used to process the media carrier in order to efficiently and conveniently reproduce the encoded (first) media signal.

The mobile device may include processing resources configured to generate the second media signal directly on the mobile device. However, in another embodiment of the present disclosure, the method may further comprise transmitting, by the mobile device, at least a part of the depth image to a conversion server, and receiving at least a part of the second media signal from the conversion server. The conversion server may be a cloud-based server, which may expose at least one interface enabling transmission of depth images and/or parameters related to the depth image, the scanned media carrier, or the encoded media signal. The conversion server may comprise a conversion engine and/or dedicated processing components configured to read the depth image, process the depth image, and generate at least a part of or the whole second media signal. The conversion server may further support the mobile device in generating the second media signal by providing one or more parts of the second media signal and/or auxiliary data for generating and/or assembling the second media signal on the mobile device.

In another embodiment, the method further comprises processing, by the mobile device, at least a part of the depth image, including identifying a carrier structure on the surface of the media carrier and overlaying a template over the carrier structure. The carrier structure may form a basis of encoding of the first media signal on the media carrier and may be defined by the encoding process for the media carrier. For example, the carrier structure may define a helical or spiral pattern on a disk-like or cylinder-like media carrier, wherein the carrier structure may start in an outer or inner area of the media carrier and may run in a spiral-like manner and concentrically around a center of the media carrier with a decreasing or increasing radius, respectively. In another example, the carrier structure may define another helical or spiral pattern on a cylinder-like media carrier, wherein the carrier structure may start at one end of the cylinder and run in a spiral-like manner at the surface of the cylinder to the other end of the cylinder, the carrier structure having substantially the same distance from the axis of the cylinder. Further types of carrier structures may include linear and curvilinear carrier structures and the like. It is to be understood that the present disclosure is not limited to a particular type of carrier structure or a particular type of media carrier. The template may correspond to a form and type of the carrier structure and may define a baseline of the carrier structure. The first media signal may be encoded on the media carrier by modifying the baseline of the carrier structure according to the first media signal, such as according to one or more samples of the media signal. The modification of the baseline of the carrier structure may be performed according to a resolution of encoding on the media carrier. The template may be overlaid over the carrier structure to closely match the template and the carrier structure.

In at least one embodiment, the second media signal is generated based on differences between the surface of the media carrier and the template. The template may be compared with the carrier structure represented in the depth image and the differences may be calculated. The differences may include optical differences, such as a deviation of color information in the depth image from a baseline color according to the template, and/or structural differences, such as spatial deviations of the carrier structure identified in the depth image from the baseline of the carrier structure according to the template.

In at least one embodiment, the template defines a sequence of the samples and the second media signal is generated based on differences at each sample of the sequence of samples. The depth image may be analyzed at each sample of the sequence and the values of the depth image at the sample may be compared to one or more corresponding baseline values according to the template.

In at least one embodiment, the method further comprises presenting, on the mobile device, a representation of the depth image to a user, receiving as user input at least one parameter, and adjusting the overlay of the template on the carrier structure based on the at least one parameter. The representation of the depth image on the mobile device may include a two-dimensional or a three-dimensional rendering of the depth image on a display of the mobile device. The rendering may further include a representation of the overlaid template. The user may be enabled to move, rotate, scale or otherwise transform and adjust the template in order to better match the carrier structure of the media carrier and the template. The user may adjust the representation, such as by zooming in or zooming out, moving or rotating the depth image (and/or the template) in order to enable the user to identify areas of interest in the depth image and/or in the overlaid template. The representation may be a magnified view of at least a part of the depth image and/or the template.

The depth image may be further automatically analyzed to identify one or more points of interest with regard to the carrier structure, the template and/or the media carrier. Initially, subsequently, or responsive to a command, the representation may be adjusted such that the representation includes at least one of the points of interest. For example, a beginning, an end, or one or more intermediate samples may be identified on the carrier structure, and the representation of the depth image may be adjusted to depict at least some of the points of interest in the depth image. Furthermore, the carrier structure and the template may be analyzed with regard to possible overlay mismatch or deviations according to one or more thresholds, and respective areas may be presented in the representation of the depth image.

In one embodiment, the method may further comprise presenting, on the mobile device, a preview of at least a part of the second media signal generated based on the adjusted overlay according to the user input. The preview may include a reduced number of samples and may have a lower quality than the reconstructed (second) media signal. The preview may also reproduce the media signal encoded in an area of interest on the surface of the media carrier, which may be adjustable by the user. The preview may be at least partially generated on the conversion server and/or on the mobile device based on available processing resources of the mobile device or available services on the network. The mobile device may be interactively used to refine the reconstruction of the second media signal by adjusting the overlay of the template on the carrier structure and providing the user with a direct feedback on the resulting reconstructed media signal. This enables both, an automated reconstruction of the encoded (first) media signal and a refined generation of the second media signal.

In one embodiment, the second media signal is generated based on spatial deviations of the template from the surface at each sample of the sequence of samples along a path defined in the template. The path may follow the baseline carrier structure defined in the template. For example, the path may follow a helical or linear carrier structure and the samples may be distributed along the path. The distance between samples may be adaptable to allow for a reconstruction of the first media signal with a desired quality. The spatial deviations of the template from the surface may be calculated based on values of the depth image or a reconstruction of the surface based on the depth image. For each sample, one or more distance values with respect to the depth image and/or the reconstructed surface may be computed and used to reconstruct one or more values for the second media signal at the sample.

In one embodiment, the deviations are determined substantially perpendicular to the surface of the media carrier and/or substantially horizontal to the surface of the media carrier. For example, a recording technique for media signals on the media carrier may include a substantially perpendicular and/or substantially horizontal modification of the surface of the media carrier according to the encoded media signal. According to one example, an audio signal may be represented as a wave signal with various frequencies and amplitudes, and the audio signal may be encoded on the media carrier by changing the structure of the surface along the path of the carrier structure according to the frequencies and amplitudes of the wave signal in a perpendicular and/or horizontal direction with regard to the surface of the media carrier. The deviations from the baseline of the carrier structure may be identified in the depth image and used to reconstruct the first media signal.

In one embodiment, the carrier structure includes a helical groove profile. The template may define at least two sidewalls along the path corresponding to the groove profile and the deviations are determined substantially perpendicular to at least one of the sidewalls. This enables encoding of one or more components of media signals with respect to the sidewalls in order to encode and reconstruct, for example, a stereo audio signal or other media signals having a plurality of components.

In another embodiment, the method further comprises adding the second media signal to a media library available via the mobile device. The mobile device may be used to convert media based on the three-dimensional scan of the surface of the media carrier and to reproduce the reconstructed second media signal directly via the mobile device. This enables an integrated processing of media in a single device, thereby speeding up the conversion process and providing an integrated experience of media via the mobile device. In one example, the user may utilize the mobile device to scan the surface of a gramophone record in order to directly receive a reconstruction of the audio signal encoded on the gramophone record and reproduce the same using the mobile device within a short period of time. In another example, the user may utilize the mobile device to scan a surface of a cylinder of a musical box or musical toy in order to directly receive a reconstruction of the music encoded on the cylinder. This may be further influenced by setting the parameters of an instrument, such as an organ, triggered by the encoded music on the cylinder. Preferably, in addition or as an alternative to the conversion server, the mobile device may be connected to a media server, which may control the processing on the mobile device, automate the reconstruction of the (first) media signal, and directly provide the user with the reconstructed (second) media signal via the media library of the mobile device. The entire processing may be automated via the media server and/or the conversion server, only requiring the user to scan the surface of the media carrier using the integrated three-dimensional scanner of the mobile device.

In one embodiment, the media carrier is a gramophone record and the first and second media signals include audio signals. The skilled person is aware of various techniques and standards for encoding an audio signal on a gramophone record and reading the gramophone record. Embodiments of the present disclosure may reflect these techniques and standards to generate the second media signal based on a surface scan of the gramophone record.

According to yet another aspect, a computer-readable medium is provided, wherein the computer-readable medium stores instructions thereon that, when executed by a computing device, cause the computing device to perform a method according to one or more embodiments of the present disclosure. Preferably, the computing device may be a mobile device and may be configured to scan, using a three-dimensional scanner of the computing device, at least a part of a surface of a media carrier encoding a first media signal, thereby generating a depth image of the surface of the media carrier, and to provide, by the computing device, a second media signal corresponding at least partially to the first media signal encoded on the media carrier, wherein the second media signal is generated based on the depth image of the surface of the media carrier. In one or more embodiments of the computer-readable medium, processing steps of the method according to one or more embodiments of the present disclosure may be provided, in any combination.

According to yet another aspect, a mobile device is provided, the mobile device comprising a three-dimensional scanner and a processor. The processor may be configured to access the three-dimensional scanner and to perform a method according to one or more embodiments of the present disclosure.

The mobile device may further include a memory. The processor may be configured to access the memory and to retrieve instructions stored in the memory. The stored instructions may define the method according to one or more embodiments of the present disclosure. The mobile device may further include a display for displaying representations of three-dimensional data, such as representations of the depth image, the template, the carrier structure, and the like, in any combination. The mobile device may further include one or more loudspeakers or interfaces for external loudspeakers, earphones, headsets or other technologies for reproducing media or sound. The mobile device may be any portable device or communication device equipped with a three-dimensional scanner. For example, the mobile device may be a mobile phone, a smartphone, a personal digital assistant, and the like. It is to be understood, that the present disclosure is not limited to a particular type of mobile device, as long as the mobile device is usable to perform conversion of media according to one or more embodiments of the present disclosure.

According to yet another aspect, a system is defined, which comprises a network, at least one conversion server accessible via a network, at least one media server accessible via the network, and one or more mobile devices connected to the network, wherein the one or more mobile devices are configured to convert media according to one or more embodiments of the present disclosure.

It is to be understood that the mobile device or the server according to further embodiments of the present disclosure may include structural or functional components that may be configured to perform steps of a method according to one or more embodiments of the present disclosure, in any combination. Likewise, the method according to further embodiments of the present disclosure may define processing corresponding to structural or functional components of the mobile device or the system according to one or more embodiments of the present disclosure, in any combination and according to any suitable processing order.

The present disclosure defines a method, a mobile device, and a system enabling a simplified conversion or reconstruction of media signals encoded on a media carrier that does not require any dedicated player for the media carrier. Rather, a mobile device is utilized to generate a depth image of the surface of the media carrier using a three-dimensional scanner of the mobile device, and the encoded media signal is reconstructed from the obtained three-dimensional data. Hence, media signals encoded on various media carriers (even in huge numbers) may be quickly and efficiently reconstructed and converted, for example, for a subsequent digital storage and direct reproduction via the mobile device.

BRIEF DESCRIPTION OF THE DRAWINGS

The specific features, aspects and advantages of the present disclosure will be better understood with regard to the following description and accompanying drawings where.

DETAILED DESCRIPTION

In the following description, reference is made to drawings, which show by way of illustration various embodiments. Also, various embodiments will be described below by referring to several examples. It is to be understood that the embodiments may include changes in design and structure without departing from the scope of the claimed subject matter.

Figure 1:
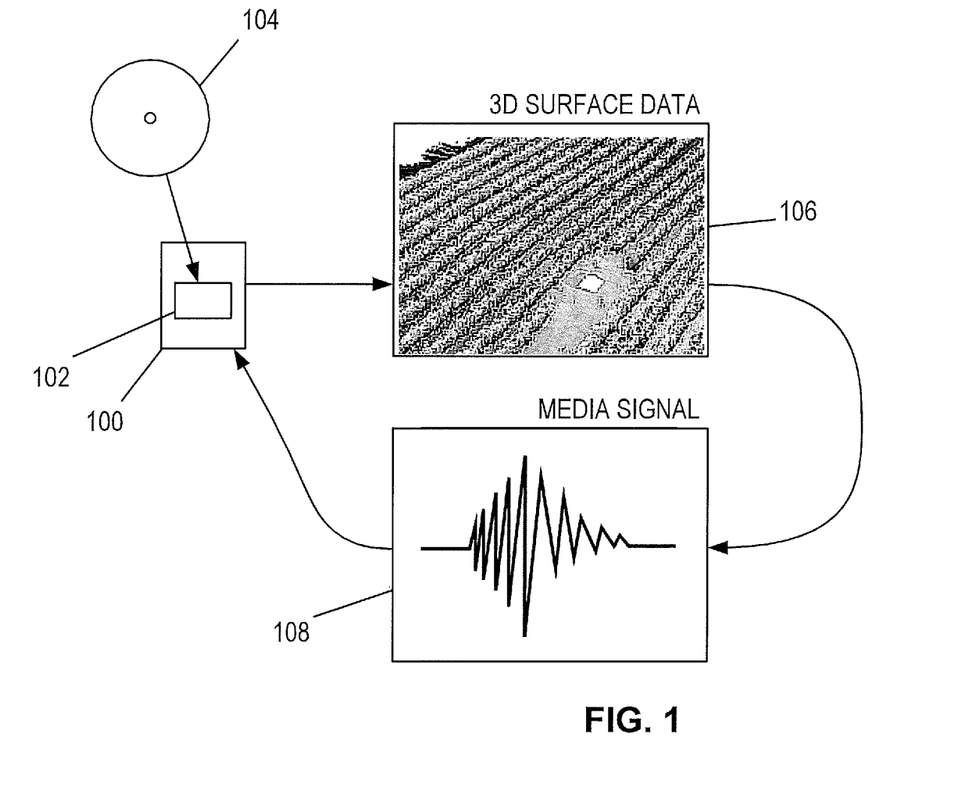
FIG. 1 depicts a mobile device and processing of media signals according to one embodiment of the present disclosure.

FIG. 1 shows a mobile device according to one embodiment of the present disclosure. The mobile device 100 may include a three-dimensional scanner 102. The three-dimensional scanner 102 may be used to scan a surface of a media carrier 104 that may encode a media signal.

The media carrier 104 may be a gramophone record encoding an audio signal. The audio signal, which may be a stereo audio signal, may be encoded on the gramophone record according to a helical groove profile, wherein signals for a left and right audio channel may be encoded with respect to sidewalls of the groove. As is known in the art, the encoded audio signal may be reproduced using a record player based on a movement of a stylus in the groove, whose mechanical displacements in the groove generate a proportional electrical signal that may be converted into a representation of the encoded audio signal. Typically, a tone arm of the record player holds a pickup cartridge over the groove to enable the stylus to track the groove in a helical or spiral-like fashion.

In order to reproduce the encoded media signal without a lengthy reproduction using a standard player for the media carrier 104, the mobile device 100 may employ the three-dimensional scanner 102 to scan the surface of the media carrier 104 and to generate corresponding three-dimensional surface data 106. The surface data 106 may be analyzed with regard to a carrier structure that may, in the example of a gramophone record, correspond to grooves on the gramophone record. The mobile device 100 may be configured to identify the carrier structure and overlay a template over the carrier structure. The template may define a baseline of the carrier structure and may further define a sequence of samples along the carrier structure. The surface data may be processed at each sample of the sequence to determine spatial (and/or optical) deviations of the surface data 106 from the template. For example, the template may define a baseline of the carrier structure as including two sidewalls of the groove and the deviations may be determined substantially perpendicular to the two sidewalls. The deviations may be further processed to reconstruct the media signal encoded on the media carrier 104 as a reconstructed media signal 108. For example, the media signal may be a stereo audio signal and each channel of the stereo signal may be encoded with regard to one of the sidewalls.

The reconstructed media signal 108 may be provided on the mobile device 100. For example, the mobile device 100 may include output components or devices for reproducing the media signal 108, such as one or more loudspeakers or interfaces to connect earphones, headsets, and the like.

The mobile device 100 may further include functionality to process the reproduced media signal. The functionality may include editing or processing of the media signal, such as editing of audio, applying filters to the media signal for noise reduction, and other post-processing functionality for media signals. Furthermore, the reconstructed (high quality) media signal 108 may be post-processed to reflect a reproduction of the originally encoded media signal, for example, by adding media artefacts that may be characteristic for the media carrier 104. For example, a filter could be applied to an audio signal to add crackling sounds resembling a reproduction of a gramophone record, or a filter could slightly delay at least parts of an audio signal to resemble a reproduction on an automated musical instrument. The processed media signal may be directly used or provided on the mobile device 100. The processing functionality may be combined with the scanning and reconstruction functionality in a single software, application, or app on the mobile device 100 in order to provide for an integrated and fluent experience of reconstruction and reproduction of media on the mobile device 100.

Even though the mobile device 100 in FIG. 1 has been described with regard to one example of a conversion of an audio signal from a gramophone record, it is to be understood that the present disclosure is not restricted to a particular type of media carrier or media signal. Rather, any kind of media signal encoded on any kind of media carrier in a form that can be captured using the three-dimensional scanner 102 may be reconstructed using the mobile device according to one or more embodiments of the present disclosure.

For example, the media carrier 104 may be a cylinder for use in a musical box, musical toy, an automated organ, a barrel piano, a reed organ, or the like. The cylinder may represent pieces of music using grooves, recesses, pins or staples (or the like) arranged on circumferential paths on the surface of the cylinder. The encoding on each path (the structure of the path) may trigger a function of a musical instrument, such as activating a pipe or triggering a reed of an organ, wherein the combined paths enable a reproduction of the media signal encoded on the cylinder. The surface data 106 may be generated by scanning the cylinder from one or more sides, generating respective one or more depth images, and combining the one or more depth images into a depth representation of (at least a part of) the cylinder. The depth representation may constitute the final surface data 106. The surface data 106 may be combined with one or more parameters, specifying the musical instrument or a desired musical instrument, which may include definitions of the functions of the musical instrument for each path. The deviations of the surface data 106 may be further analyzed to determine when (and for how long) the functions of the musical instrument are triggered in order to generate the reconstructed media signal 108. Accordingly, the mobile device enables a quick scan of the cylinder and a direct reproduction of the music encoded on the cylinder even without the original musical instrument, such as the musical box or the automated organ, being present. As a matter of fact, the original musical instrument may be non-existent. Hence, the mobile device may enable reproduction of media that would be lost otherwise. The encoded music may also be transcoded to different musical instruments.

In one example, the encoded media signal may be a visual signal on a painting or image. Accordingly, the media carrier 104 may be a canvas and the surface data 106 may include the color information as well as depth information related to a structure of the canvas. The surface data 106 may be analyzed to determine a quality or faults in the canvas and the respective color information may be processed to compute a reconstructed image. For example, based on the analysis of the structure of the canvas, the color information of the surface data 106 may be processed, spatially transformed, interpolated and/or their color values may be adjusted, in any combination. Furthermore, the processed color information may be rendered using the surface data to generate the reconstructed media signal 108.

Figure 2:
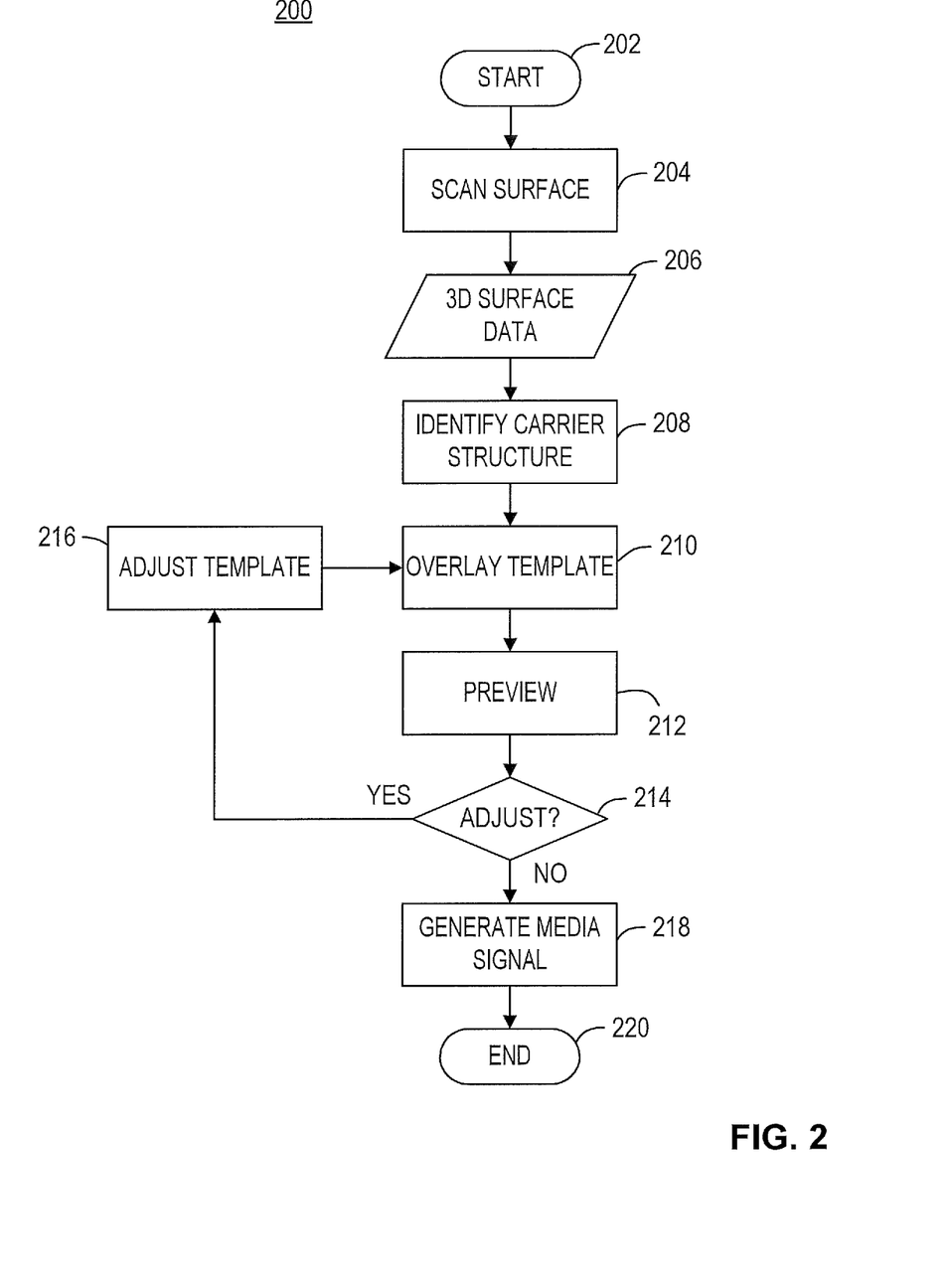
FIG. 2 shows a flow chart of a method according to one embodiment of the present disclosure.

FIG. 2 shows a flow chart of a method according to one embodiment of the present disclosure.

The method 200 may start in item 202 and may continue in item 204, wherein at least a part of a surface of a media carrier may be scanned using a three-dimensional scanner of a mobile device. The media carrier may encode a first media signal, such as an audio signal or an image signal. The three-dimensional scanner may be configured to generate a depth image of the surface of the media carrier. The depth image may be comparable to a two-dimensional image, wherein each picture element (pixel) may include depth information. In another example, the depth image may include a point cloud, wherein each point may include depth information. It is to be understood that the three-dimensional scanner may generate depth images with other or similar elements that reflect a three-dimensional structure of the surface.

The depth image may enable a three-dimensional reconstruction of the surface of the media carrier, resulting in a three-dimensional surface data 206. The three-dimensional surface data 206 may be used in item 208 to identify a carrier structure on the surface of the media carrier. For example, pattern matching techniques may be applied to identify a regular pattern according to one of a plurality of templates. For example, the media carrier may be a gramophone record and the surface data 206 may be matched with regard to helical or spiral-like groove profiles as defined in a template. In another example, the media carrier may be a cylinder for a musical box (or another automated musical instrument) and the surface data 206 may be matched with regard to equidistant circumferential paths on the surface of the cylinder as defined in another template. In yet another example, the media carrier may be a canvas and the surface data 206 may be matched with regard to a mesh of graphical elements. Further parameters of the template may define structural features of the media carrier, such as a standardized size, a central hole, a diameter, and the like, to aid the matching process.

Based on the identified carrier structure and a suitable template, the template may be overlaid over the carrier structure in item 210. The template may define a sequence of samples following a path of the carrier structure that may be regarded as a baseline. For example, the path may follow a groove profile of a gramophone record or one or more paths on a cylinder. At each sample, one or more differences between a baseline of the template and the surface data 206 may be determined and used to generate a sample of the encoded media signal. For example, the template may define at least two sidewalls along the groove profile and the media signal may be determined based on spatial deviations of the template from at least one of the sidewalls at at least some of the samples, preferably in at least one direction substantially perpendicular to at least one of the sidewalls. In another example, the template may define circumferential paths on a cylinder and the media signal may be determined based on spatial deviations of the template (recesses or protuberances) in the path.

In item 212, a preview of the reconstructed media signal may be generated based on at least a subset of the samples and the preview may be presented to a user of the mobile device. The preview may be further combined with a representation of the surface data 206 that may be overlaid with the template and the user may be enabled to adjust the overlay of the template, for example, by moving, rotating, scaling, or otherwise transforming the template.

In item 214, the mobile device may determine whether the user has modified parameters of the template, and if any parameters have been modified, the method 200 may continue in item 216 by adjusting the template and generating a new overlay in item 210.

If no parameters are modified in item 214, the method may proceed with item 218, wherein the entire reconstructed media signal may be generated. The generation of the media signal in item 218 may be similar to the generation of the preview in item 212. However, the generation in item 218 may include further passes of the surface data 206 and a more detailed analysis of the structure and the differences between the surface data 206 and the overlaid template. Furthermore, multiple sequential scans of the surface can be used and combined in item 218, for example, to refine the surface data 206.

The generation may be performed, at least partially on the mobile device. Additionally or as an alternative, the generation may be at least partially performed on a media server and/or a conversion server that may be accessible by the mobile device via a network. In this example, the mobile device may communicate with the media server and/or the conversion server and provide the surface data 206 to the media server and/or the conversion server in order to receive the generated media signal. The media server and/or the conversion server may be further adapted to generate or at least support the generation of the preview and guide the overlay of the template in item 210. The method 200 may end in item 220.

It is to be understood that the processing according to the method 200 may be performed sequentially or in parallel in any order and combination. Furthermore, individual items may be repeated or may be optional. For example, items 208 to 216 may represent advantageous processing according to one more preferred embodiments, however, the items 208 to 216 may be optional in other embodiments. Accordingly, in one embodiment, the method may scan the surface in item 204 and provide the surface data 206 to a conversion server in order to receive the media signal generated in item 218, without requiring a further overlay and adjustment of the template. Also, item 204 may be performed multiple times to refine the surface data 206.

Figure 3:
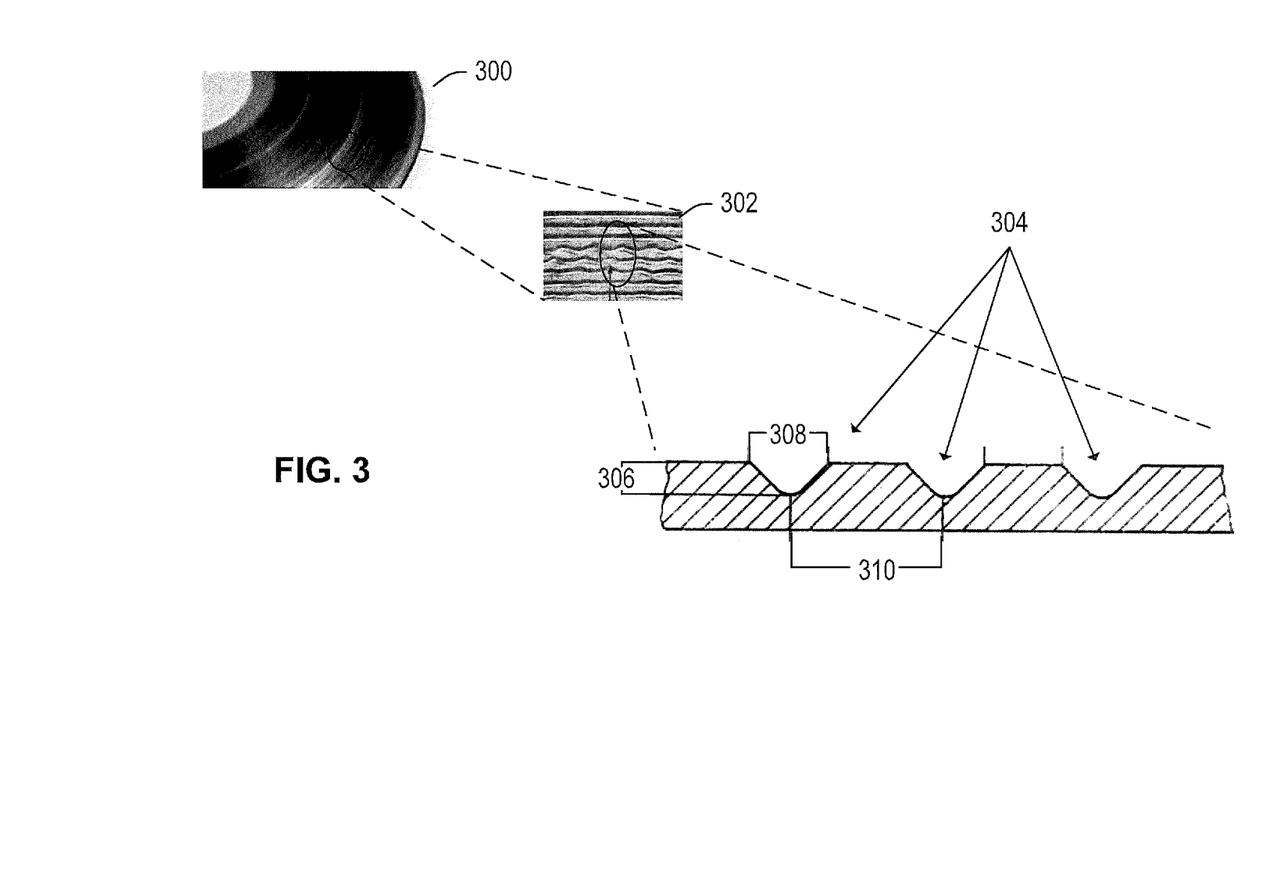
FIG. 3 illustrates an encoded audio signal on a gramophone record processed using a mobile device according to one embodiment of the present disclosure.

FIG. 3 shows one example of encoding of a media signal on a media carrier, which may be processed using a three-dimensional scanner of a mobile device according to one embodiment of the present disclosure. In the example of FIG. 3, the media carrier may be a gramophone record 300. The gramophone record 300 may have a groove profile, an enlarged portion of which is shown at 302. Each groove 304 may have a depth 306 and a width 308. Furthermore, the grooves may be spaced apart by a distance 310. Each groove 304 may have two slanted sidewalls and a bottom. An audio signal may be encoded on the gramophone record 300 by displacing the sidewalls of each groove 304 substantially horizontal to the surface of the gramophone record 300 and perpendicular to the course of the grooves 304, as is known in the art.

According to one example, a standardized gramophone record 300 may have a groove width 308 of 40 µm, and the distance 310 between the grooves may be 70 µm. This enables an encoding at a maximum amplitude of up to 30 µm on each side of the groove. In one example, assuming a 16 bit reconstruction of the encoded audio signal, the deviation of the groove could be sampled at 30 µm/$2^{16}$=0,00046 µm. According to another example, for an 8 bit reconstruction, the sampling resolution may be at or below 0.12 µm. Furthermore, in order to generate a reconstruction at a sampling rate of 44.1 kHz, for a minimal speed of the gramophone record of 0.0675 m/s at the innermost grooves, the samples may be placed apart along the track of the groove at a distance of 0.0675 m/s/44.1 kHz=0.001531 µm or below. For a sampling rate of 20 kHz, the sample distance may be at or below 0.003375 µm.

In another example directed at a cylinder or barrel for an automated musical instrument, the resolution of the encoding may depend on a diameter and length of the cylinder, spacing of the paths on the surface of the cylinder and a revolution speed of the cylinder. In one example, the sample distance may be at or below the range of millimeters.

The scanning device may be selected for a desired resolution of the reconstructed media signal, wherein the resolution of the reconstructed media signal may again depend on the encoding standard for the media carrier, such as the signal and sampling rate of an audio signal encoded on gramophone records. However, it is to be understood that the present disclosure is not limited to a particular quality or resolution of the reconstructed media signal and, rather, a lower or a higher quality may be used, which may depend on an available resolution of the three-dimensional scanner of the mobile device.

A selection of the scanning device may be based on the formula $$A = \min\left(\frac{a}{2r}, \frac{v}{s}\right),$$

wherein a is a maximum amplitude of the carrier structure, such as grooves or paths, v is the (minimum) sample speed of the media carrier, s is the desired sample rate (in Hz), and r is the desired resolution of the reconstructed media signal (in Bit). A may define a minimal resolution of the scanning device.

By providing mobile devices with integrated three-dimensional scanning devices, a convenient and fast conversion of encoded media signals from media carriers may be achieved. In particular, a user of the mobile device may directly reproduce the media signal encoded on the media carrier without the need for an original media player for the media carrier or without using costly and time-consuming professional services for media reconstruction.

The converted media signals may be directly reproduced on the mobile devices. In one embodiment, the mobile device may be used for subsequent digital storage of the media signals. For example, the converted media signal may be stored as a digital image, a video file, an mp3 file, or in any other suitable media or audio format.

In another embodiment, the converted media signal may be imported and reproduced via a media library provided on the mobile phone. This may enable a direct reproduction of the imported media signals. The media library may be hosted on the mobile device or as a cloud-based service and may further enable a connection to further services. The further services may, for example, identify the encoded media signal and provide respective attributes, such as the name of an artist, a title of a track or a title of the gramophone record, and the like. In one embodiment, the user may be provided with the automatically identified attributes and may adjust or correct any of these attributes. The results may be stored in the media library and/or may be further used to update a general repository or database of media attributes, which may also be used by the service in other media libraries. Furthermore, if the respective information is not available via the general repository or database, the mobile device may be used to take a photograph of the record sleeve and/or register further information accompanying the gramophone record, which may also be stored in the media library (or in the general repository).

In a preferred embodiment, the media library may be shared across a plurality of devices of the user, such as other mobile devices, desktop devices and the like. The devices may be linked using any kind of communication technology, such as via WiFi, Bluetooth, or other wireless technology, or via a wired connection, such as USB, a direct link or a wired network access.

In yet another embodiment, the media library may be linked to a social platform available via a network in order to enable an exchange of media, attributes, or comments, and the like, with other users. The other users may be related to the user on the social platform and may be, for example, identified and labeled as friends, family, or colleagues of the user on the social platform. The social platform may further enable a comparison of the media libraries between two or more users, suggest links between users of the social platform, and/or propose concerts, live performances, or other events based on (and related to) similarities between the media libraries of the users and/or arrange appointments to the suggested events between two or more users based on the comparison of the media libraries and available events. This enables a highly integrated social platform directed at media content.

While some embodiments have been described in detail, it is to be understood that aspects of the disclosure can take many forms. In particular, the claimed subject matter may be practiced or implemented differently from the examples described and the described features and characteristics may be practiced or implemented in any combination. The embodiments shown herein are intended to illustrate rather than to limit the invention as defined by the claims.

The invention claimed is:

1. A method of generating a media signal based on a surface scan of a media carrier, comprising:
    scanning, using a three-dimensional scanner of a mobile device, at least a part of a surface of a media carrier encoding a first media signal, thereby generating a depth image of the surface of the media carrier, wherein the first media signal is encoded in the media carrier by mechanically or optically constructed changes in the surface of the media carrier; and
    providing, by the mobile device, a second media signal corresponding at least partially to the first media signal encoded on the media carrier, wherein the second media signal is generated based on the depth image of the surface of the media carrier.

2. The method of claim 1, further comprising transmitting, by the mobile device, at least a part of the depth image to a conversion server, and receiving at least a part of the second media signal from the conversion server.

3. The method of claim 1, further comprising processing, by the mobile device, at least a part of the depth image, including identifying a carrier structure on the surface of the media carrier and overlaying a template over the carrier structure.

4. The method according to claim 3, wherein the second media signal is generated based on differences between the surface of the media carrier and the template.

5. The method according to claim 3, wherein the template defines a sequence of samples and the second media signal is generated based on differences between the surface of the media carrier and the template at each sample of the sequence of samples.

6. The method according to claim 5, wherein the second media signal is generated based on spatial deviations of the template from the surface at each sample of the sequence of samples along a path defined in the template.

7. The method according to claim 6, wherein the deviations are determined substantially perpendicular to the surface of the media carrier and/or substantially horizontal to the surface of the media carrier.

8. The method according to claim 6, wherein the carrier structure includes a helical groove profile, wherein the template defines at least two sidewalls along the path corresponding to the groove profile and the deviations are determined substantially perpendicular to at least one of the sidewalls.

9. The method according to claim 3, further comprising presenting, on the mobile device, a representation of the depth image to a user, receiving as user input at least one parameter, and adjusting the overlay of the template on the carrier structure based on the at least one parameter.

10. The method according to claim 9, further comprising presenting, on the mobile device, a preview of at least a part of the second media signal generated based on the adjusted overlay according to the user input.

11. The method according to claim 1, further comprising adding the second media signal to a media library available via the mobile device.

12. The method according to claim 1, wherein the media carrier is a gramophone record and the first and second media signals include audio signals.

13. A mobile device comprising:
a three-dimensional scanner; and
a processor, wherein the processor is configured to access the three-dimensional scanner to perform a method of generating a media signal based on a surface scan of a media carrier, the method comprising:
scanning, using the three-dimensional scanner of the mobile device, at least a part of a surface of a media carrier encoding a first media signal, thereby generating a depth image of the surface of the media carrier, wherein the first media signal is encoded in the media carrier by mechanically or optically constructed changes in the surface of the media carrier; and
providing, by the mobile device, a second media signal corresponding at least partially to the first media signal encoded on the media carrier, wherein the second media signal is generated based on the depth image of the surface of the media carrier.

14. The mobile device according to claim 13, wherein the processor is further configured to transmit at least a part of the depth image to a conversion server, receive at least a part of the second media signal from the conversion server, and process at least a part of the depth image, including identifying a carrier structure on the surface of the media carrier and overlaying a template over the carrier structure.

15. The mobile device according to claim 14, wherein the second media signal is generated based on differences between the surface of the media carrier and the template, and wherein the template defines a sequence of samples and the second media signal is generated based on differences at each sample of the sequence of samples.

16. The mobile device according to claim 15, wherein the second media signal is generated based on spatial deviations of the template from the surface at each sample of the sequence of samples along a path defined in the template, wherein the deviations are determined substantially perpendicular to the surface of the media carrier and/or substantially horizontal to the surface of the media carrier.

17. The mobile device according to claim 16, wherein the carrier structure includes a helical groove profile, wherein the template defines at least two sidewalls along the path corresponding to the groove profile and the deviations are determined substantially perpendicular to at least one of the sidewalls.

18. The mobile device according to claim 14, wherein the processor is further configured to present, on the mobile device, a representation of the depth image to a user, receive as user input at least one parameter, adjust the overlay of the template on the carrier structure based on the at least one parameter, and present, on the mobile device, a preview of at least a part of the second media signal generated based on the adjusted overlay according to the user input.

19. The mobile device according to claim 13, wherein the processor is further configured to add the second media signal to a media library available via the mobile device.

20. A system comprising:
a network;
at least one conversion server accessible via the network;
at least one media server accessible via the network; and
one or more mobile devices, the one or more mobile devices being connectable to the network, and at least one of the one or more mobile devices comprising:
a three-dimensional scanner; and
a processor, wherein the processor is configured to access the three-dimensional scanner to perform a method of generating a media signal based on a surface scan of a media carrier, the method comprising:
scanning, using the three-dimensional scanner of the mobile device, at least a part of a surface of a media carrier encoding a first media signal, thereby generating a depth image of the surface of the media carrier, wherein the first media signal is encoded in the media carrier by mechanically or optically constructed changes in the surface of the media carrier; and
providing, by the mobile device, a second media signal corresponding at least partially to the first media signal encoded on the media carrier, wherein the second media signal is generated based on the depth image of the surface of the media carrier.

* * * * *